(12) United States Patent
Edmunds

(10) Patent No.: US 9,783,272 B2
(45) Date of Patent: Oct. 10, 2017

(54) SYSTEM AND METHOD FOR CONTROLLING ROLLING MOTION OF A MARINE VESSEL

(71) Applicant: ROLLS-ROYCE plc, London (GB)

(72) Inventor: Colin R. Edmunds, Abergavenny (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 15/077,430

(22) Filed: Mar. 22, 2016

(65) Prior Publication Data

US 2016/0288884 A1    Oct. 6, 2016

(30) Foreign Application Priority Data

Apr. 2, 2015 (GB) .................................. 1505697.1

(51) Int. Cl.
*B63B 39/00* (2006.01)
*G05D 1/08* (2006.01)
*G08G 5/02* (2006.01)

(52) U.S. Cl.
CPC ............ *B63B 39/005* (2013.01); *B63B 39/00* (2013.01); *G05D 1/0875* (2013.01); *G08G 5/02* (2013.01)

(58) Field of Classification Search
CPC .... B63B 39/005; B63B 39/00; G05D 1/0875; G08G 5/02
USPC ........ 701/16; 114/258, 261; 342/33, 357.34, 342/357.23, 357.53
See application file for complete search history.

(56) References Cited

U.S. PATENT DOCUMENTS

| | | | |
|---|---|---|---|
| 2010/0228408 A1* | 9/2010 | Ford | G01C 21/165 701/16 |
| 2014/0114509 A1 | 4/2014 | Venables et al. | |
| 2014/0247184 A1* | 9/2014 | Wendel | G01S 5/14 342/357.48 |
| 2014/0350754 A1* | 11/2014 | Elgersma | G08G 5/025 701/16 |
| 2015/0246711 A1* | 9/2015 | Lee | B63B 21/50 405/224 |

FOREIGN PATENT DOCUMENTS

| | | |
|---|---|---|
| EP | 2277771 A1 | 1/2011 |
| EP | 2506235 A2 | 10/2012 |

(Continued)

OTHER PUBLICATIONS

Sep. 15, 2015 Search Report issued in British Patent Application No. 1505697.1.

(Continued)

*Primary Examiner* — Marthe Marc-Coleman
(74) *Attorney, Agent, or Firm* — Oliff PLC

(57) ABSTRACT

A system for countering the rolling motion of a marine vessel, includes one or more sensors adapted to characterize a sea condition approaching the vessel, one or more control systems, a computer, and one or more active stabilizers. The computer is adapted to receive the characterized sea condition data, is further adapted to generate one or more control signals in dependence on the characterized sea condition data, and is still further adapted to transmit the or each control signal to the or each control system. The or each control system is in turn adapted to actuate the or each active stabilizer in response to receipt of the or each control signal, to counter the rolling motion of the marine vessel.

8 Claims, 3 Drawing Sheets

(56) References Cited

FOREIGN PATENT DOCUMENTS

| GB | 2320829 A | 7/1998 |
|---|---|---|
| JP | H08-48288 A | 2/1996 |
| WO | 2014/066645 A1 | 5/2014 |

OTHER PUBLICATIONS

Aug. 19, 2016 Search Report issued in European Patent Application No. 16 16 1378.

* cited by examiner

_US 9,783,272 B2_

SYSTEM AND METHOD FOR CONTROLLING ROLLING MOTION OF A MARINE VESSEL

This disclosure claims the benefit of UK Patent Application No. GB 1505697.1, filed on 2 Apr. 2015, which is hereby incorporated by reference in its entirety.

FIELD OF THE DISCLOSURE

The present disclosure relates to a system and method for countering the motion of a marine vessel and particularly, but not exclusively, to a system and method for countering the rolling motion of a ship.

BACKGROUND TO THE DISCLOSURE

Seagoing or marine vessels will, in normal sailing conditions, experience rolling motion due to wave interactions with the vessel, as shown in FIG. 1.

Referring to FIG. 1, and in the context of the present disclosure, the term roll, when applied to a marine vessel 10, is defined as the rotation 20 of the vessel 10 about its longitudinal (i.e. bow 40 to stern 50) axis 30.

Such wave interactions usually take the form of waves impinging on the vessel from a position at some angle to the beam of the vessel. This interaction results in an athwardtships wave component acting in a direction normal to the fore-aft axis of the vessel. This athwardtships wave component of the impinging wave causes the vessel to roll in one direction as the wave passes, and then to roll onto the opposite beam once the crest of the wave has passed and the roll moment is reversed.

There may be exceptional cases where significant roll may be caused by a system of waves encountering the vessel from directly ahead or directly astern or close to these two conditions.

The rolling motion resulting from such wave interactions with the vessel may be extreme under various conditions of excitation and vessel loading. A consequence of such rolling motion is that ship-board equipment may be subjected to damage resulting from high loads, and passengers and crew may be distressed and/or incapacitated.

Consequently, it has become an accepted practice that some classes of vessel are equipped with active stabilization systems to reduce roll. An example of such a system is the use of fins projecting from both sides of the vessel which are controlled to present a hydrodynamic angle of attack to the flow of water past the ship. The angle of the fins results in the generation of a restoring moment that acts to counter the direction of roll experienced by the vessel.

For example, roll induced loads may result in container ships experiencing structural problems for cargo locating equipment. Such loads may cause discomfort and/or seasickness for passengers on cruise ships and ferries. Roll induced loads may cause more serious problems for naval vessels in the disruption of the process of targeting and discharging weapons, and also in restricting the operational envelope for the launch and recovery of aerial or marine vehicles.

Conventional active roll stabilization systems for marine vessels rely on physical sensors detecting the vessel's roll motion before they activate the stabilizers. This means that roll is still experienced on board the vessel.

Current systems controlling the operation of fin stabilizers suffer from the following handicap:

In such conventional systems it is currently necessary to receive data from sensors aboard the vessel which sense the rate and/or magnitude of roll. Sensors of this type can give no useful output until the vessel is already in the process of rolling. The stabilization system cannot, therefore, be activated until the vessel has already built up a rolling inertia. Consequently, the stabilizer system will then be attempting to arrest the motion of a very large moving mass before it can begin to impose a counteracting moment to correct the rolling moment. This takes a significant period of time (in terms of the wave period) which means that the vessel is still subject to the effects of roll.

STATEMENTS OF DISCLOSURE

According to a first aspect of the present disclosure there is provided a system for countering the rolling motion of a marine vessel, the motion control system comprising: one or more sensors adapted to characterize a sea condition approaching the vessel;

one or more control systems;

a computer, the computer being adapted to receive the characterized sea condition data;

the computer being further adapted to generate one or more control signals in dependence on the characterized sea condition data;

the computer being still further adapted to transmit the or each control signal to the or each control system; and one or more active stabilizers, wherein the or each control system is adapted to actuate the or each active stabilizer in response to receipt of the or each control signal, to counter the rolling motion of the marine vessel.

The system of the disclosure provides for the active roll stabilization systems of marine vessels by remotely measuring the characteristics of the approaching wave field and after processing the information obtained, forming an estimate of the effective wave slope to be encountered.

Knowledge of the angle between the wave fronts and the vessel's heading and speed through the water allows the calculation of the likely wave slope at the predicted time of encounter. This will allow the control system to be activated at such a time as the restoring forces from the active stabilizers can be deployed in a manner so as to anticipate the loads expected both in terms of force and time.

The system will also allow the response of the roll reduction system to be tailored to varying vessel loading conditions if desired.

Optionally, the at least one sensor characterizes approaching waves by determining one or more of the wave height, the wave length, the wave surface slope, the wave roughness, and the wave grouping.

Wave height, wave length, and wave surface slope are well defined and can be readily measured.

Wave roughness, on the other hand, can be defined by wave-age scaling (first proposed by Kitaigorodsjii and Volkov; (1965) Izv. Atmos. Oceanic Phys., 1, 973-988), or by steepness scaling (proposed by Taylor and Yelland: (2000) J. Atmos. Oceanic Technol., 17, 82-89). These techniques provide a measure of the roughness length of the sea state, which can in turn affect the ability of a sea state to displace a marine vessel.

There are several measures of wave grouping that enable the quantification of the groupiness of a succession of waves.

Optionally, the or each active stabilizer is selected from the group comprising rudders, fins, foils and trim tabs, propellers, steerable water jets, internal stabilizers, movable weights, and anti-roll tanks.

An active stabilizer is defined as any actuatable element that can be configured to have a righting effect on the vessel.

Optionally, the or each sensor is adapted to collect sea condition data from the marine vessel's far field.

The depth of field of the or each sensor will have an influence on the precision of the prediction of the sea surface profile.

The depth of field over which the sea profile is initially scanned can be considered as being half the wavelength of the fundamental and hence the profile may be conveniently decomposed into the harmonic components of the 'nominal' full wavelength.

Optionally, the marine vessel's far field extends from the vessel for a distance of 1,000 m.

In one arrangement, the system has a sensor depth of field of 1,000 m. This provides for a balance between affording sufficient data sampling points to be able to determine an effective prediction of the sea surface profile, and not requiring so many data sampling points as to increase the cost and complexity of the required data processing.

In another arrangement the system may collect sea condition data over several different 'field depths'. The data from each discrete field depth may then be processed separately or collectively in order to characterize the approaching wave field.

According to a second aspect of the present disclosure there is provided a method of countering the rolling motion of a marine vessel, the marine vessel comprising one or more active stabilizers, the method comprising the steps of:

sensing a speed and a heading for the marine vessel relative to the approaching wave;

characterizing a first surface profile of a wave field approaching the marine vessel, using one or more sensors;

predicting a second surface profile of the wave field resulting from the wave field encountering the marine vessel at a chosen time in the future, using the characterized first surface profile, together with the vessel's speed and heading;

computing one or more control signals, using the predicted second sea surface profile; and transmitting the one or more control signals to the one or more active stabilizers, to cause the one or more active stabilizers to apply a heeling moment to the marine vessel to counter the roll moment produced by the impingement of the wave field on the marine vessel.

An advantage of the method of the disclosure is that the amplitude of the stabilization input can be timed and scaled to meet the most likely roll exciting input. This increases the effectiveness of the stabilization because it will be possible to reduce roll by countering the heeling moment at the time it begins to take effect rather than being required to wait until the vessel acquires a rolling inertia that can be sensed, after which delay it will be necessary to provide sufficient stabilization to both stop the existing roll and counteract the remaining heeling moment.

Optionally, the or each active stabilizer is selected from the group comprising rudders, fins, foils and trim tabs, propellers, steerable water jets, internal stabilizers, movable weights, and anti-roll tanks.

Optionally, the step of:

characterizing a first surface profile of a wave field approaching the marine vessel, using one or more sensors, comprises the step of:

measuring characteristics of at a wave field approaching the marine vessel to thereby generate a first sea surface profile.

Optionally, the characteristics may be selected from the group comprising wave height, wave length, wave surface slope, wave roughness and wave grouping.

Optionally, the step of:

predicting a second surface profile of the wave field corresponding to a future impingement of the wave field on the marine vessel, using the characterized first surface profile, together with the vessel's speed and heading, comprises the steps of:

predicting a first impingement time being the time at which the approaching wave field will impinge on the marine vessel;

applying a harmonic analysis technique to decompose the first surface profile into constituent simple sinusoidal wave components of known amplitude and length;

predicting the wave celerity of the constituent sine waves;

determining the relative phase shift of the sinusoidal wave components; and phase shift the component waves for the future impingement of the wave field on the marine vessel for the time involved and then recombine the constituent wave components in their shifted relationship to derive a new wave slope corresponding to the future impingement of the wave field on the marine vessel.

Wave profiles are routinely modelled as sine waves; this being standard oceanographical practice.

Furthermore it is well known that any wave form can be considered as a sum of sine and cosine waves having frequencies f, 2f, 3f, 4f, 5f.

Although a typical wave comprises an infinite series of such sine waves, it is accepted engineering practice that the amplitudes of the higher harmonics, say 4f and higher, are small in comparison with the amplitudes of the lower harmonics, these being f to 3f. Consequently, these higher waveforms can be neglected with de minimis influence on the accuracy of the decomposition.

In one arrangement, the periodic waves can be decomposed into a Fourier series. In another arrangement, this decomposition can be achieved using another mathematical technique.

The recombination of a collection of constituent wave components to form an original, or 'parent' waveform is well known mathematical practice.

Optionally, for a sea depth being greater than half of the wave length, the wave celerity of the constituent sine waves is predicted by:

$$\left( \text{celerity}_{d > \frac{L}{2}} = \sqrt{\frac{gL}{2\pi}} \right)$$

where:
g=acceleration due to gravity (m/s$^2$);
L=wave length (m); and
d=sea depth (m).

The speed (or celerity) of a wave in deep water (where the depth is greater than half of the wave length) is considered to be a function only of the wave length, as defined above. This is an established oceanographical relationship.

It is also assumed that this method of active roll stabilization control will primarily be used in deep water conditions with predominantly long crested seas (but with the adoption of a suitable spectral composition for the sea area concerned and using one of a range of standard spreading functions of the waves in the area of sailing it will allow the technique to be extended to more confused, short crested seas). This assumption is considered to be reasonable because significant wave conditions are more likely to be encountered in open seas (i.e. deep water) than in shallow (i.e. coastal) waters where shoaling conditions will likely result in shorter and more irregular waves.

Optionally, for a sea depth being greater than 0.05 times the wave length but less than half of the wave length, the wave celerity of the constituent sine waves is predicted by:

$$\left(\text{celerity}_{\frac{L}{20}<d<\frac{L}{2}} = \sqrt{\frac{gL}{2\pi}\tanh\left(2\pi\frac{d}{L}\right)}\right)$$

where:
g=acceleration due to gravity (m/s$^2$);
L=wave length (m); and
d=sea depth (m).

The use of a different expression for wave celerity provides for the method to be applicable in intermediate or even shallow water (with regard to wavelength). While this expression allows for the technique to be extended to operation in 'intermediate' depth seas, it introduces a greater margin of error than for operation in deep water.

Optionally, the step of:
the control system automatically acting on at least one of the one or more control signals in advance of the predicted sea surface profile to actuate one or more active stabilizers to thereby control the rolling motion of the marine vessel, comprises the step of:
calculating the degree of actuation required to be fed into the stabilizer at what instant so that a stabilization effort is deployed as the marine vessel encounters the sea condition corresponding to the predicted sea surface profile, so as to prevent roll of the marine vessel.

By countering the heeling moment as it is experienced by the vessel the degree of stabilization required is greatly reduced. This in turn results in lower power-consumption, less wear on the stabilizer system, and lower noise generated. All of these make the method and system of the disclosure more efficient and desirable for a user.

A further advantage of the method is that the predictive nature of the method requires smaller stabilizing forces, which in turn mean that the stabilizing elements may be reduced in size. This in turn results in less parasitic drag being generated by the stabilizing system.

Optionally, the step of:
determining a predicted sea surface profile using the detected actual sea surface profile, comprises the additional initial step of:
calculating an allowance for spreading.

There are several methods of deriving the energy spectra of a short crested sea using one of the standard spreading functions, for example, Cosine squared or Cosine −2S, based on an assumed limit of spreading. As an illustration, below are examples of the calculation of these two parametric spreading functions, both reproduced from Coastal Engineering Technical Note I-28, 'Directional Wave Spectra Using Cosine-Squared & Cosine 2S Spreading Functions', U.S. Army Engineer Waterways Experiment Station Coastal engineering Research Centre, Ref: CETN-I-28 6/85.

The basic premise of all parametric functions is that the single peaked directional spectrum is adequately represented by the product of two functions:

$$E(f,\theta)=E(f)\cdot D(f,\theta)$$

where;
E(f,θ)=Directional spectral density function
E(f)=one-dimensional energy spectral density function
D(f,θ)=angular spreading function
f=frequency in Hertz
θ=direction in Radians
The formulation of D(f,θ) requires that:

$$\int_0^\infty \int_{-\Pi}^{\Pi} E(f)D(f,\theta)d\theta df = \int_0^\infty E(f)df$$

1) Cosine Squared $$D(\theta) = \begin{cases} \frac{2}{\Pi}\cos^2(\theta-\theta_0), & \text{for } \left(-\frac{\Pi}{2}+\theta_0\right)<\theta<\left(\frac{\Pi}{2}+\theta_0\right) \\ 0, & \text{otherwise} \end{cases}$$

where:
$\theta_0$=mean wave direction in radians
2) Cosine-2S $$D(f,\theta) = \left(\frac{2^{(2s-1)}}{\Pi}\right)\left(\frac{\Gamma^2(s+1)}{\Gamma(2s+1)}\right)\cos^{2s}\left(\frac{\theta-\theta_0}{2}\right)$$

where:
Γ=the Gamma function
$\theta_0$=the mean wind direction
s=the spreading parameter, a function of frequency & windspeed.

Reference to frequency in the above indicates that it will first be necessary to construct a spectrum of physical wave heights from the energy spectrum for each of the spread components to allow the preparation of a model of the vertical displacements. Michel ('Sea Spectra Simplified', pp 17-28, Marine Technology, 1968) has demonstrated one practical route to reconstruct physical wave heights from energy spectra. Kawauchi et al. ('Comparative study of Ocean Wave Height Estimation with Power Spectral Density Function By Three Methods', Mathematical and Physical Fisheries Science, 8 (2010) pp. 70-89) have discussed this question and provided a correlation between energy and height distribution.

Further discussion of the relationship of wave height distribution and directional spreading can be found in van Vledder et al., 'Individual Wave Height Distributions in The Coastal Zone: Measurements And Simulations And The Effect Of Directional Spreading', Coastal Dynamics, 2013.

In practice, the presence of only a single long-crested wave system cannot be guaranteed and situations will be unavoidably encountered where two (or more) such systems are present. The fact that wave heights are additive means that phase differences will result in points on the surface where the individual waves will interact both constructively and destructively to vary the surface elevation. This variation in elevation will have a collateral effect on the wave surface slope and consequently the heel inducing moment.

When there is an angle between the advancing wave fronts that taken together give the resultant wave field, the consequence is that the wave field will appear less orderly and is referred to as 'short crested'. Whilst an infinite number of possible component waves can theoretically exist, the usual design practice is to assume that there is some primary wave direction, say $\theta$, and that there exist a finite number of secondary wave fields distributed evenly over the range:

$$-\phi_{max} < \phi - \theta < \phi_{max}$$

where $\phi_{max}$ is the limit of spreading.

Once a model of the distribution of physical heights has been obtained, a corresponding model of surface slopes can be extracted to cover the range of interest. This could then be employed as the 'model' element of a Kalman filter or similar control technique to allow a 'best estimate' of the slope which can be compared with the actual measured slope as the point of encounter is approached. This approach can be combined with other suitable software based control techniques to refine and fine tune the control of the roll reduction system.

According to a third aspect of the present disclosure there is provided a marine vessel according to the first aspect of the disclosure, wherein the one or more sensors are distributed along the length of the marine vessel.

By distributing the sensors along the length of the vessel it becomes possible to increase the field of coverage provided by the sensor array. This enables the wave field approaching the vessel to be characterized over a wider area, which improves the accuracy of prediction of the impinging wave field.

Optionally, the one or more sensors are duplicated along the length of each of the port and starboard sides of the marine vessel.

According to a fourth aspect of the present disclosure there is provided a landing system for landing either unmanned or autonomous aerial vehicles of fixed or rotary wing type on a marine vessel, the vehicle comprising a landing control system, the landing system comprising:

a system according to the first aspect of the disclosure; and a communications module;

wherein, the communications module is adapted to bidirectionally transmit positional data between the system, and the landing control system of the vehicle which may process the positional data autonomously to optimize its landing approach to coincide with the most benign set of vessel motions.

By roll stabilising the vessel it becomes very much simpler for a UAV to land on the vessel.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
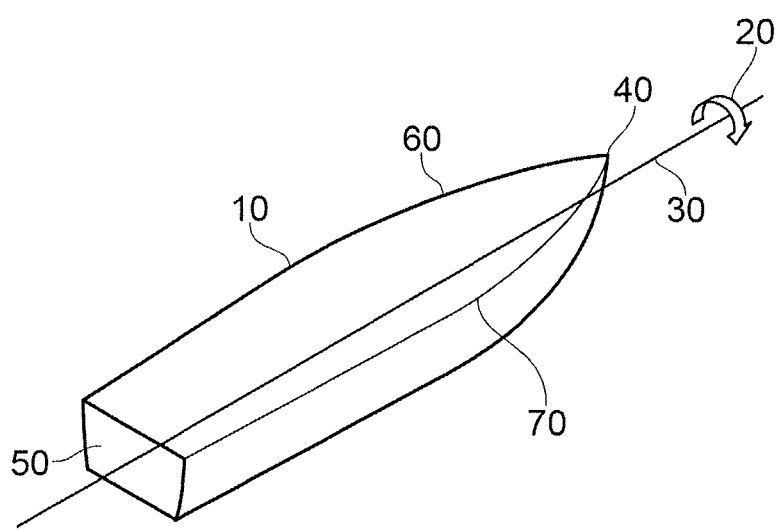
FIG. 1 shows a perspective view of a marine vessel illustrating roll of the vessel.
Figure 2:
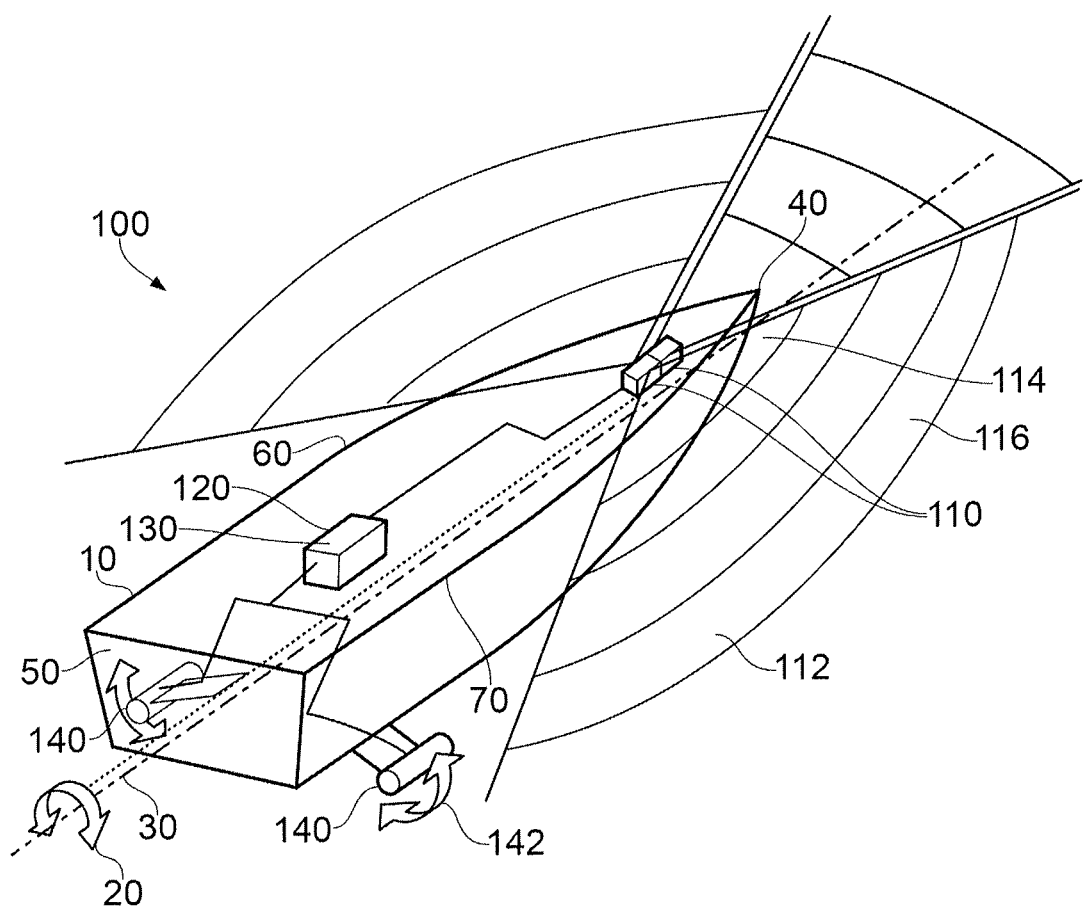
FIG. 2 shows a perspective view of a marine vessel according to an embodiment of the disclosure.

Referring to FIG. 2, a system for countering the rolling motion of a marine vessel according to an embodiment of the disclosure is designated generally by the reference numeral 100.

The system 100 is shown installed on a marine vessel 10. The marine vessel 10 is provided with one or more (two, in the embodiment shown in the figures) active stabilizers 140.

In the present embodiment, the two active stabilizers 140 take the form of steerable pod thrusters 140.

The system 100 comprises one or more sensors 110, one or more control systems 120, a computer 130, and one or more active stabilizers 140.

The present embodiment comprises three sensor arrays 110, a first sensor array 110 directed forwards along the longitudinal axis 30 of the marine vessel 10, a second sensor array 110 directed outwardly across the port beam 60, and a third sensor array 110 directed outwardly across the starboard beam 70.

These sensor arrays 110 are radar sensors. However, in another arrangement of the system the sensor arrays 110 may take the form of another sensor such as, for example, microwave or ultrasonic sensors.

In another arrangement, the marine vessel may also be equipped with a sensor array directed forward over the bow, or an existing sensor array may be realignable to look forward, and the same technique of analysis, decomposition, phase shift and subsequent recombination for ahead seas to generate an approximation to a future wave form will be used to form a prediction of heave and pitch response at specific instances in the future. Other than in the case of SWATH type vessels and some types of catamarans and hydrofoils, there is currently no practicable means of control over pitch response. In these cases therefore, the system would be intended primarily to provide an estimate of the predicted motion for use by independent but linked control systems embedded in other vessels, platforms or structures, such as Landing Systems, docking systems, replenishment at sea systems of heave compensated cranes or winches. Such systems may or may not be autonomous in nature, but it is anticipated that the primary beneficiaries of providing such information would be systems capable of autonomous decision making.

The sensor arrays 110 are connected to the computer 130. The computer 130 is then connected to the or each control system 120. The or each control system 120 is then connected to each of the active stabilizers 140.

Figure 3:
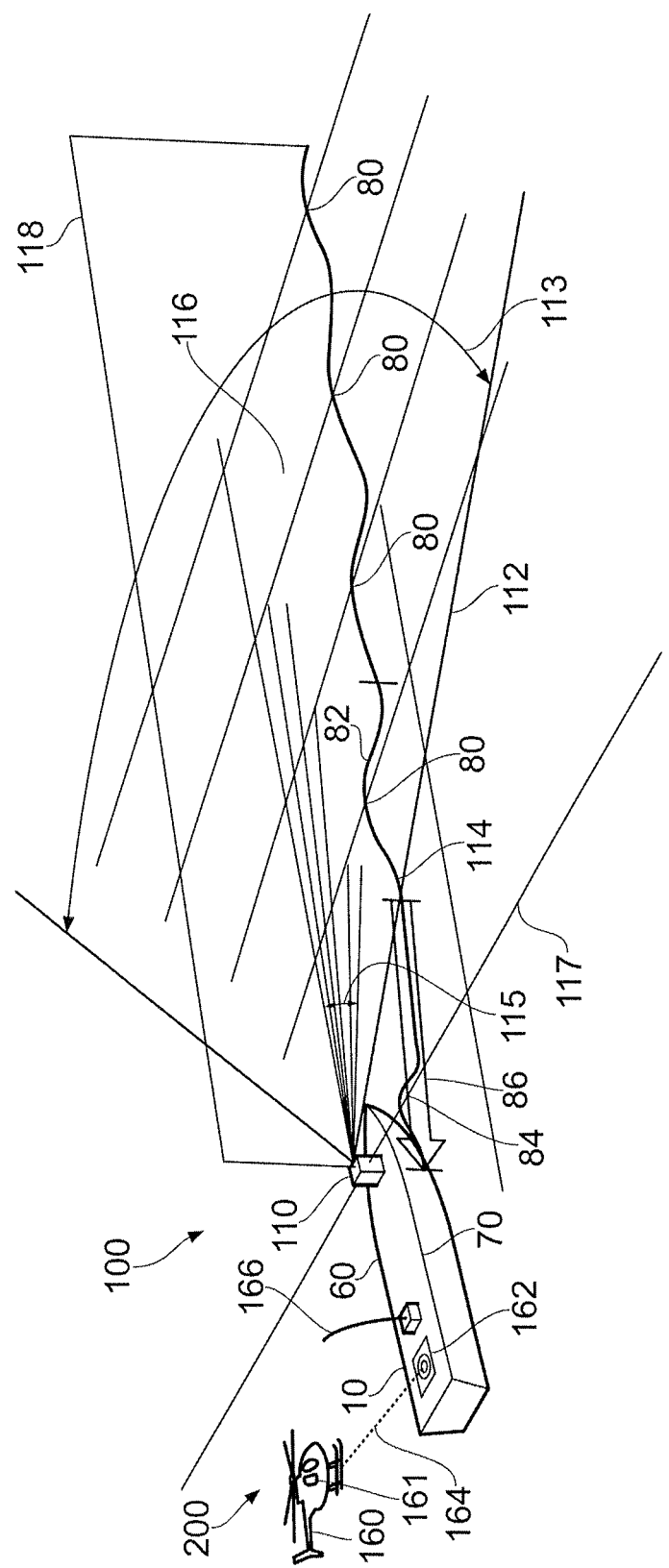
FIG. 3 shows a perspective view of the vessel of FIG. 2 showing the sensing geometry.

In use, as shown in FIG. 3, the sensor arrays 110 scan an area of sea 112 extending from the vessel through a near field area 114 to a far field area 116. The sensor arrays 110 generate a dataset that characterizes the sea condition approaching the vessel 10.

As illustrated in FIG. 3, the sensor array 110 scans in both the horizontal plane 117 and the vertical plane 118. Horizontally, the scan area 112 is defined by a horizontal field angle 113, while vertically the scan area 112 is defined by a vertical field angle 115.

In the example illustrated in FIG. 3, the scan area 112 encompasses four wavefronts, or wave crests, 80.

The characterized sea condition data defines a first surface profile 82 of the approaching wave field 80. This characterized sea condition data in the form of the first surface profile 82 is transmitted to the computer 130.

The computer 130 receives the first surface profile 82 from the sensor arrays 110, processes this data, in conjunction with a real-time data stream relating to the speed and heading of the vessel 10, to produce a predicted second surface profile 84 of the wave field at some point in the future when it will impinge on the vessel 10.

The computer 130 then goes on to generate one or more control signals in dependence on the relationship between the predicted second surface profile 84 and the vessel 10. The or each control signal is then transmitted to the active stabilizers 140 to cause the active stabilizers 140 to generate a stabilizing moment 142.

This stabilizing moment 142 is determined to be sufficient to exactly counter the rolling moment resulting from the interaction between the predicted second surface profile 84 of the approaching wave field and the vessel 10. In this way, the stabilizing moment 142 counters the rolling moment and maintains the vessel 10 in an athwardtships level configuration.

Referring to FIG. 3, a landing system for landing an unmanned aerial vehicle (UAV) 160 on a marine vessel 10 is designated generally by the reference numeral 200. The UAV 160 comprises a landing control system 161.

The landing system 200 comprises a system 100 for countering the rolling motion of a marine vessel 10, as described above, together with a communications module 166.

The communications module 166 is adapted to communicate bidirectionally between the system 100 and the landing control system 161 of the UAV 160.

In use, the communications module 166 transmits positional data relating to the position and orientation of the vessel 10. This positional data is then used by the landing control system 161 of the UAV 160 to navigate a landing path 164 onto a deck of the vessel 10.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. A method of countering a rolling motion of a marine vessel, the marine vessel comprising one or more active stabilizers, the method comprising the steps of:
   sensing a speed and a heading for the marine vessel relative to an approaching wave;
   characterizing a first surface profile of a wave field approaching the marine vessel, using one or more sensors;
   predicting a first impingement time being the time at which the approaching wave field will impinge on the marine vessel;
   applying a harmonic analysis technique to decompose the first surface profile into constituent simple sinusoidal wave components of known amplitude and length;
   predicting a wave celerity of the constituent sine waves;
   determining a relative phase shift of the sinusoidal wave components; and
   phase shift the component waves for a future impingement of the wave field on the marine vessel for the time involved and then recombine the constituent wave components in their shifted relationship to derive a second surface profile corresponding to the future impingement of the wave field on the marine vessel;
   computing one or more control signals, using the second surface profile; and
   transmitting the one or more control signals to the one or more active stabilizers, to cause the one or more active stabilizers to apply a heeling moment to the marine vessel to counter a roll moment produced by an impingement of the wave field on the marine vessel.

2. The method as claimed in claim 1, wherein the or each active stabilizer is selected from the group comprising rudders, fins, foils and trim tabs, propellers, steerable water jets, internal stabilizers, movable weights, and anti-roll tanks.

3. The method as claimed in claim 1, wherein the step of:
   characterizing a first surface profile of a wave field approaching the marine vessel, using one or more sensors,
   comprises the step of:
   measuring characteristics of a wave field approaching the marine vessel to thereby generate a first sea surface profile.

4. The method as claimed in claim 3, wherein the characteristics are selected from the group comprising wave height, wave length, wave surface slope, wave roughness and wave grouping.

5. The method as claimed in claim 1, wherein, for a sea depth being greater than half of the wave length, the wave celerity of the constituent sine waves is predicted by:

$$\left( \text{celerity}_{d > \frac{L}{2}} = \sqrt{\frac{gL}{2\pi}} \right)$$

where:
g=acceleration due to gravity (m/s$^2$);
L=wave length (m); and
d=sea depth (m).

6. The method as claimed in claim 1, wherein, for a sea depth being greater than 0.05 times the wave length but less than half of the wave length, the wave celerity of the constituent sine waves is predicted by:

$$\left( \text{celerity}_{\frac{L}{20} < d < \frac{L}{2}} = \sqrt{\frac{gL}{2\pi} \tanh\left(2\pi \frac{d}{L}\right)} \right)$$

where:
g=acceleration due to gravity (m/s$^2$);
L=wave length (m); and
d=sea depth (m).

7. The method as claimed in claim 1, wherein the step of:
   the control system automatically acting on at least one of the one or more control signals in advance of the predicted sea surface profile to actuate one or more active stabilizers to thereby control the rolling motion of the marine vessel, comprises the step of:
   calculating the degree of actuation required to be fed into the active stabilizer at what instant so that a stabilization effort is deployed as the marine vessel encounters the sea condition corresponding to the predicted sea surface profile, so as to prevent roll of the marine vessel.

8. The method as claimed in claim 1, wherein the step of:
determining a predicted sea surface profile using the detected actual sea surface profile, comprises the additional initial step of:
calculating an allowance for spreading.

* * * * *